United States Patent
Bivol

(10) Patent No.: US 9,356,652 B2
(45) Date of Patent: May 31, 2016

(54) FREQUENCY HOPPING RADIO SYSTEM

(71) Applicant: Paul-Marius Bivol, Bacau (RO)

(72) Inventor: Paul-Marius Bivol, Bacau (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/435,204

(22) PCT Filed: Oct. 30, 2012

(86) PCT No.: PCT/IB2012/055998
§ 371 (c)(1),
(2) Date: Apr. 13, 2015

(87) PCT Pub. No.: WO2014/068363
PCT Pub. Date: May 8, 2014

(65) Prior Publication Data
US 2015/0270869 A1     Sep. 24, 2015

(51) Int. Cl.
*H04B 1/00*     (2006.01)
*H04B 1/7143*     (2011.01)
*H04B 1/715*     (2011.01)

(52) U.S. Cl.
CPC ............. *H04B 1/7143* (2013.01); *H04B 1/715* (2013.01); *H04B 2001/7154* (2013.01)

(58) Field of Classification Search
CPC ..................... H04B 2001/7154; H04B 1/7143; H04B 1/715; H04B 1/713; H04B 1/7156; H04B 2001/71563; H04B 2001/7152
USPC ......... 375/130, 132–137, 227–228, 259–285, 375/316–352
See application file for complete search history.

(56) References Cited

U.S. PATENT DOCUMENTS

| | | | | |
|---|---|---|---|---|
| 4,532,636 A * | 7/1985 | Wilkinson | ............. | H04K 1/003 375/136 |
| 6,009,332 A * | 12/1999 | Haartsen | ............... | H04W 16/16 455/444 |
| 6,240,125 B1 * | 5/2001 | Andersson | ............. | H04B 1/715 375/132 |

(Continued)

FOREIGN PATENT DOCUMENTS

WO     99-59273 A1     11/1999

OTHER PUBLICATIONS

International Search Report and Written Opinion correlating to PCT/IB2012/055998 dated Jul. 24, 2013.

(Continued)

*Primary Examiner* — James M Perez

(57) ABSTRACT

An electronic device is provided for determining a hopset for a frequency hopping radio communication system. The hopset is a number of radio channels in a range of channels available for radio communication, and other channels in the range constituting a channel pool of pool channels. A hopset processor assesses quality of the radio channels for communication, and removes a channel from the hopset when the assessed quality is below a predetermined threshold. A probability set is provided, the probability set having probability values for respective radio channels in the range, which probability values are adapted based on the assessed quality in the respective radio channels. A replacement channel is selected in a pseudorandom way from the channel pool weighted by the probability values, and then added to the hopset. Due to the pseudorandom selection of channels for the hopset the system can efficiently cope with various interferences.

20 Claims, 6 Drawing Sheets

(56) References Cited

U.S. PATENT DOCUMENTS

| | | |
|---|---|---|
| 7,280,580 B1 | 10/2007 | Haartsen |
| 7,280,607 B2 * | 10/2007 | McCorkle et al. ............ 375/295 |
| 2001/0048691 A1 * | 12/2001 | Chang .................. H04W 2/082 370/442 |
| 2003/0031231 A1 | 2/2003 | You et al. |
| 2003/0198281 A1 * | 10/2003 | Grier .................... H04B 1/7143 375/133 |
| 2005/0041752 A1 * | 2/2005 | Rosen ........................... 375/268 |
| 2006/0133543 A1 * | 6/2006 | Linsky .................. H04B 1/715 375/341 |
| 2007/0206660 A1 | 9/2007 | Lifchuk |
| 2009/0257396 A1 | 10/2009 | Eliezer et al. |
| 2010/0281322 A1 | 11/2010 | Park et al. |

OTHER PUBLICATIONS

You, et al: "Adaptive Frequency Hopping Scheme for Interference-Limited WPAN Applications", IEEE, Electronics Letters, vol. 37, Issue: 15, Jul. 19, 2001, pp. 976-978.

\* cited by examiner

FREQUENCY HOPPING RADIO SYSTEM

FIELD OF THE INVENTION

This invention relates to electronic devices for a frequency hopping radio communication system, using a number of radio channels in a range of channels available for radio communication.

More specifically, the invention is in the field of determining which channels to use for the frequency hopping radio communication system based on channel quality.

BACKGROUND OF THE INVENTION

U.S. Pat. No. 6,240,125 describes a radio communications systems which utilize frequency hopping. The channels are chosen such that channels which have high channel quality for a given connection are used more often than channels having lower channel quality for the same connection. Channel quality, for instance interference, is measured with respect to uplink connections and with respect to downlink connections. The measured interference values are then stored in an interference list for each of the connections in the radio communications system. The interference lists are converted to corresponding weight lists for each of the connections in both uplink and downlink in the base station. A channel which has a high weight value for a given connection will appear more often in corresponding hopsequence lists than a channel which has a lower weight value.

A problem of the above system is that the hopsequence lists are based on measured interference values, which has the effect that the system is not able to efficiently cope with varying types of interference.

SUMMARY OF THE INVENTION

The present invention provides an electronic device, and a method, as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
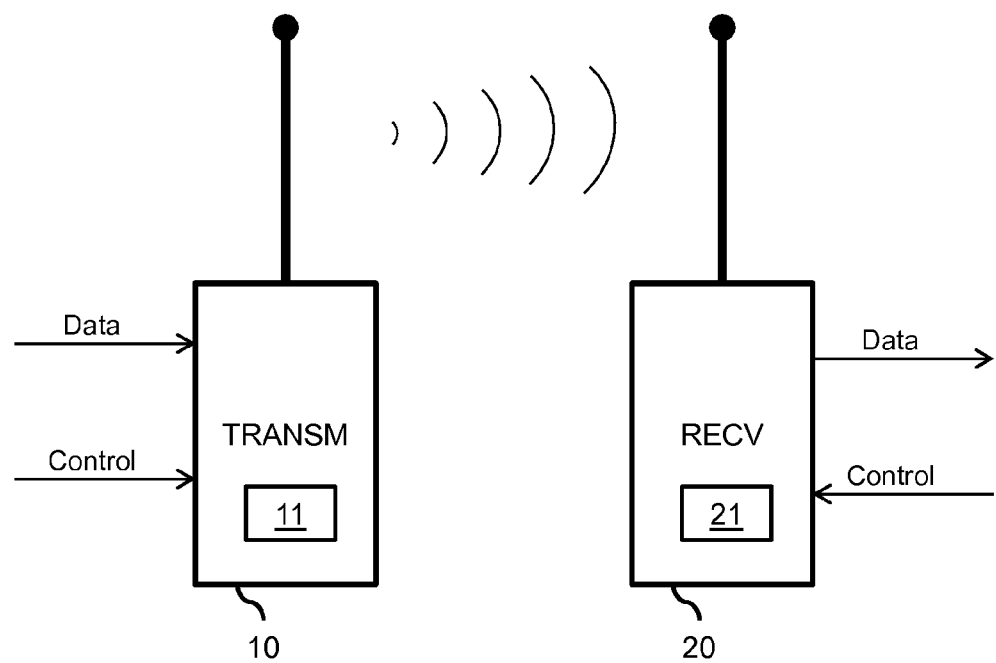
FIG. 1 shows an example of radio devices for frequency hopping radio communication.

FIG. 1 shows an example of radio devices for frequency hopping radio communication. In the Figure a first device 10 is a transmitter having a data interface for receiving data to be transmitted according to a frequency hopping radio system and a control interface for corresponding control information, for changing the transmitter's operation settings, e.g. by a user. A second device 20 is shown arranged to receive the transmitted signal, and having a data interface for transferring the data retrieved from the received signal, and a control interface for control information for changing the receiver's operation settings.

As such, frequency hopping is a well known radio transmission system for accommodating many users in a shared frequency band, and coping with various types of interference. The frequency band is commonly subdivided in a range of channels at adjacent frequencies. When radio communication is troubled by interference, such systems change to a different channel in the range of channels, so-called frequency hopping. In many such systems a limited number of channels is preselected for use from the available range, the set of channels being called a hopset. Frequency hopping may be done by setting a next channel in the hopset when the dwell time expires, e.g. via commands received on the control interface.

Various frequency hopping methods are known. FH refers to Frequency Hopping which is simply hopping randomly without taking any extra information into account except a list of allowed channels and the dwell time. The time a frequency hopping system uses a channel until it hops to another one is called the dwell time, which is, in other words, the time between two consecutive hops. AFH is Adaptive Frequency Hopping, which is similar to FH but when it detects a bad channel the system removes that channel from the list of allowed channels for a certain period of time. FS is Frequency Static which is a system that does not use any control for frequency hopping during a communication session. It just uses a same channel for the entire duration of operation. FR is Frequency Rolling which is a more complex method in which a smaller window is defined in the list of allowable channels and frequency hopping is performed within that window until channels are exhausted. When this happens the window moves one channel to the right and the operation resumes. When the window reaches the end of the list of allowable channels, it rolls over. If a bad channel is detected then a new window is defined at a random position.

In FIG. 1, the transmitter 10 is shown to have a hopset processor 11, which is arranged for determining a hopset for a frequency hopping radio communication system in an enhanced way as described below. The receiver 20 is shown to also have a hopset processor 21, which is arranged for managing the hopset for the frequency hopping radio communication system, e.g. receiving the hopset from the transmitter 10. The hopset contains the set of radio channels that are currently assigned for radio communication, a specific channel of the hopset being used for a period of time, a specific purpose, a specific link, etc, as required by the particular frequency hopping radio communication system. The components of the hopset processor include processing to assess the quality of a channel.

The device 10 further has a radio transceiver for the frequency hopping radio communication system. The radio transceiver may be coupled to the hopset processor, and the hopset processor may be arranged for controlling the radio transceiver to perform the radio communication on a radio channel from the hopset, and optionally also a perform a receiver 20 hopset update.

The quality of the channels can be assessed in various ways. A suitable measure detects a bad channel if the communication attempt fails. There can be other metrics for assessing the quality of a channel like: measuring signal strength at the receiver, detecting an interference signal prior to sending data, determining a signal to noise ratio (SNR), measuring bit error rate, etc. There can also be a complex metric composed of the ones above, which translates into probability values that determine the chance of being selected as described below. For example, if the signal strength is low then decrement probability by 1; if there is an interferer signal present then decrement the probability by 25; if the data was corrupted decrease the probability by half etc. It is noted that known systems try to avoid detecting a bad channel using communication failure because this lowers performance of such systems.

The hopset processor includes processing maintain a set of probability values for the channels, e.g. by increasing the probability of a good channel, decreasing the probability of a bad channel, and processing to select a channel in a pseudo-random way. The probability table may reflect a success/failure rate of each channel but the values in the table are the probabilities of selection (e.g. from 1 to 255). In a mathematical sense these values may be normalized (in the example divided by 255 in order to take values from 0 to 1), but in embedded programming it is more efficient to work with integers than real numbers. The process that fills the gaps in the hopset takes the probability values as input and pseudo-randomly chooses channels according to their probabilities.

The process of hopset control may include the following actions. When a channel is considered to be bad it is removed from the hopset and moved to the channel pool. Subsequently the channel selection algorithm may be triggered. A good channel will not be replaced but it's probability may be modified by increasing up to a predetermined maximum e.g. 255 at the upper end of a range of 0-255. The quality of the channels, and subsequently the alteration of probability values, can be assessed in various ways as indicated above.

The channel replacement process may be used at the operational end of the hopset, i.e. when the hopset is exhausted. It may alternatively be triggered each time after a channel has been removed, or if the hopset is reduced to an insufficient number of channels. An exhausted hopset is a hopset from which all the channels were used for hopping in the hop sequence as intended.

In an embodiment, the channel replacement procedure is triggered when the hopset is exhausted. Channels are used one by one, in order, from the said hopset, until the last channel is used. With respect to the hopset length, the replacement process is as follows. The new hopset formed by the channel replacement procedure is filled to have the same length as the old one. If there were no bad channels within the hopset the channel replacement procedure is omitted. The hopset maintains the number of channels constant to perform well against self interference. The number of channels may be defined as required for the frequency hopping radio system, because it is dependent on the frequency band, government regulations, product functional requirements etc. Optionally, the channels evaluated as good remain at the same index in both old and new hopset.

It is noted that a gap in the hopset may be occupied by a channel that has been previously removed. Thereto probabilities are no further decreased than to a predetermined minimum, e.g. 1 at the lower end of a range of 0-255, in order to not exclude a channel completely. The functions of the hopset processor, which involve hopset adaptation in a frequency hopping radio system, are elucidated in detail with reference to FIGS. 3 and 4.

Figure 2:
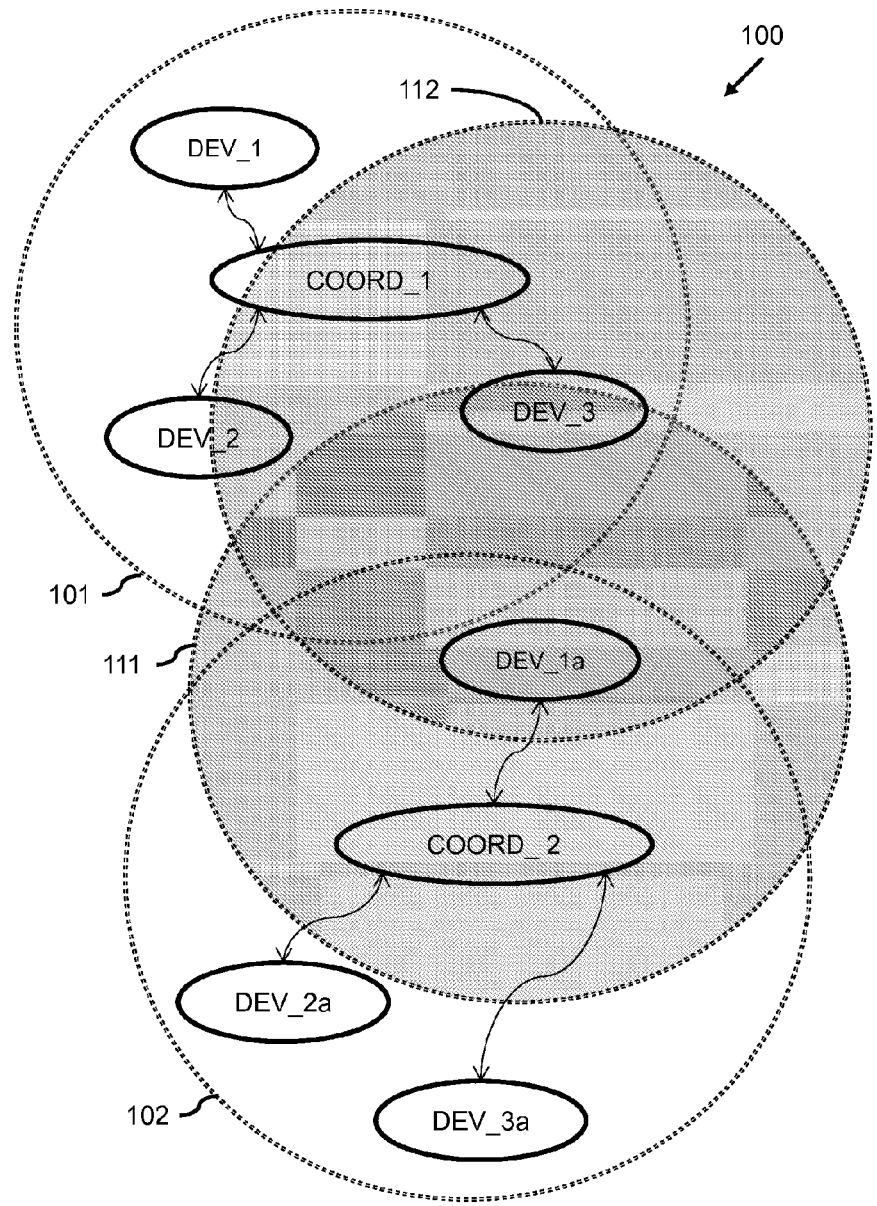
FIG. 2 shows an example of a frequency hopping radio communication system.

FIG. 2 shows an example of a frequency hopping radio communication system. The frequency hopping radio communication system 100 is shown to have two overlapping areas using a same frequency band. A first area 101 is under the control of a first coordinator device COORD_1 in communication with three radio communication devices DEV_1, DEV_2 and DEV_3. A second area 102 is under the control of a second coordinator device COORD_2 in communication with three radio communication devices DEV_1a, DEV_2a and DEV_3a. The devices may all be transmitting and receiving using the same band, and frequency hopping is used to cope with interference as described above. In particular, it is to be noted that the devices under the control of the first coordinator are not aware of any channels in use by devices under the control of the second coordinator. For example, DEV_1a may be using a selected channel and transmit a radio signal that is strongly present in a roughly circular first area 111, whereas DEV_3 may be using the same channel and transmit a radio signal that is strongly present in a second area 112. Both DEV_1a and DEV_3 will experience a bad channel due to said interference because both device are within an overlapping section of the first and second area.

In the example two networks are depicted; one is coordinated by coordinator 1 and the other by coordinator 2. Both networks may have independent hopsets, or different frequency hopping schemes. The coordinator may be responsible for generating a hopset and distributing the hopset to the end devices. The end devices may have no responsibilities except to maintain synchronization to their coordinators. Because of the fact that end device 3 and end device 1a are in each other's coverage area collisions may occur that require hopset changes in both networks. End device 2a and 3a although being in each other's coverage area may not collide because these situations are managed by the coordinator using methods defined in the communication stack. However, inter-network collisions may occur and cannot be predicted. Moreover, other unknown sources of interference such as microwave ovens may cause further unpredictable interference.

The proposed system for determining a hopset may be used in novel or existing frequency hopping systems, such as point to multipoint topologies like ZigBee or Bluetooth. It may also be used in extensions on WiFi, or along with the IEEE 802.15.4e standard which already defines the hopset distribution process but not the hopset generation scheme.

Figure 3:
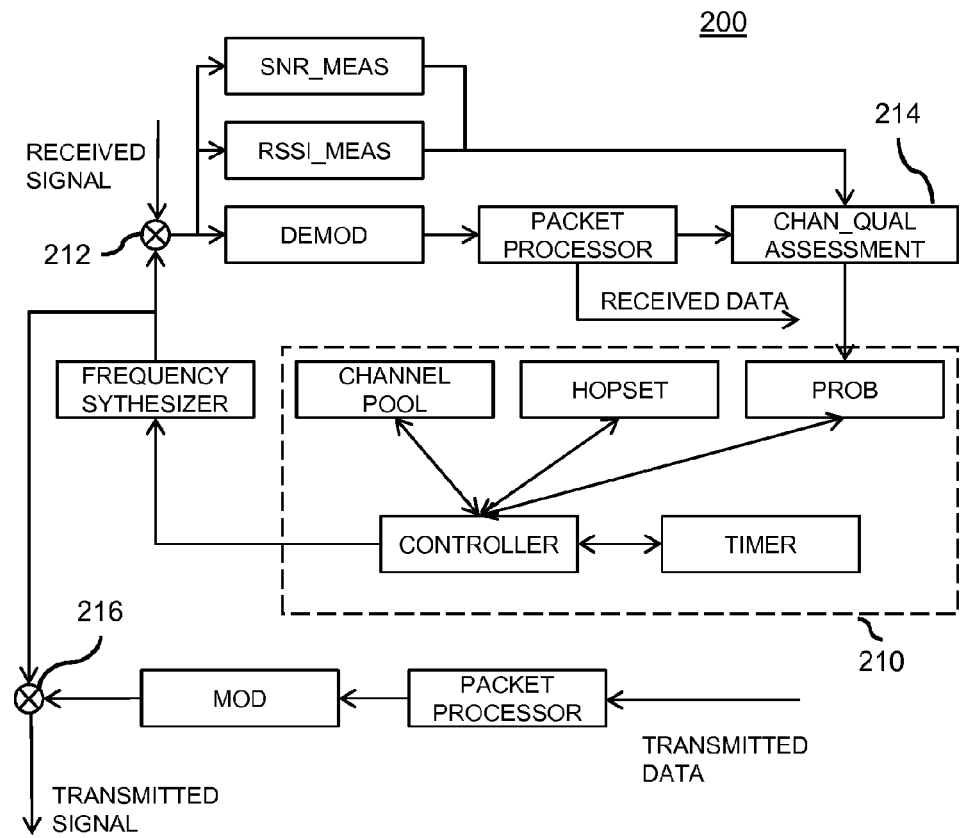
FIG. 3 shows an example of an electronic device for determining a hopset for a frequency hopping radio communication system.

FIG. 3 shows an example of an electronic device for determining a hopset for a frequency hopping radio communication system. The device 200 has a hopset processor 210 for controlling a frequency synthesizer to use channels from a hopset. The device further has communication blocks for performing radio communication of data packets, which are well known as such and only schematically shown.

The communication blocks for receiving data include a receiver unit 212 for receiving a received signal on a frequency as defined by the frequency synthesizer. The receiver unit is coupled to a demodulator DEMOD, followed by a Packet Processor, which retrieve received data. A channel quality unit 214 is provided for assessment of the quality of the radio transmission on the channel that is in use. The channel quality unit may be coupled to the packet processor for receiving communication success or failure data, or error information as detected by the packet processor in the received packets. As such, determining whether communication succeeded or failed is known as such. In most communication stacks a request is made from an upper layer to a lower layer to transmit data. The lower layer must report the outcome of the request that can be success or failure. Most systems implement a number of retries in case of failure. In the case of failure the lower layer may report the reason like "no ack received", "no ack received after a number of retries", channel busy"", etc. The specific method of assessing the communication status does not impact the performance or functionality of the system of determining the hopset.

The channel quality unit may be coupled to a signal to noise measurement unit SNR_MEAS for receiving signal to noise ratio information. Also, the channel quality unit may be coupled to a received signal strength measurement unit RSSI_MEAS for receiving signal strength information. Channel quality so assessed may be coupled to the hopset processor 210.

Hence, optionally, the hopset processor may be arranged for determining whether errors occurring during radio communication on a respective channel exceed a predetermined level, and, if so, decreasing the probability value of the respective channel by a error quantity. The hopset processor may be arranged for, during said decreasing, determining said error quantity in dependence of the amount of the errors occurring. Also, the hopset processor may be arranged for determining whether a signal to noise ratio on a respective channel exceeds a predetermined level, and, if so, decreasing the probability value of the respective channel by a noise quantity. The hopset processor may be arranged for, during said decreasing, determining said noise quantity in dependence of signal to noise ratio. Hence, when a low SNR is detected on a channel, the noise quantity may be relatively high, so the channel is heavily penalized and the chance of being selected is substantially reduced.

The communication blocks for transmitting data include a transmitter unit 216 for transmitting a signal on a frequency as defined by the frequency synthesizer. The transmitter unit is coupled to a modulator MOD, preceded by a Packet Processor, which encodes data to be transmitted.

The hopset processor 210 may have a control unit CONTROLLER coupled to a timer unit TIMER for performing the hopset control and selection functions as described in detail below. The controller is arranged to manage a hopset HOPSET and a channel pool CHANNEL POOL, and a set of probability values PROB for example in a probability table, as shown in the Figure. The hopset has a number of radio channels in the range of channels available for radio communication, for example in a frequency hopping radio communication system as described above with reference to FIGS. 1 and 2.

In the example, other channels in the range, i.e. channels not being part of the hopset, are called a channel pool of pool channels. The channel pool has the remaining channels that are not used by the hopset, but are available to be used for radio communication.

The problem addressed is increasing performance in frequency hopping systems by lowering the collision rate, in particular in a crowded, interference prone environment. Thereto, the proposed system adapts a frequency hopping sequence based on success or failure of communication by replacing channels that failed. The replacement is based on a set of probability values of the respective channels. Initially, for example, a hopset may be generated pseudo randomly by selecting from the range of radio channels available. All the possible channels not included in the generated hopset form a set called a channel pool. The set of probability values represents a probability of every channel in the hopset and in the pool. The probability value for a channel is based on the quality of the channel and represents the probability of selection when a replacement channel is to be selected. During normal operation channels are used from the hopset, e.g. as ordered therein. If communication on a particular channel succeeds the corresponding probability value is incremented. If communication fails for a channel the probability value is decremented and the channel may be moved to the channel pool.

When the hopset has been exhausted, empty spaces (caused by removal of channels that failed) will be filled with channels chosen pseudorandomly from the channel pool according to their probability as represented in the set of probability values. The chosen channel will be removed from the channel pool, and added to the hopset. After the replacement or replacements have been performed, normal execution restarts with the new hopset. The channel pool, after adaption, and corresponding probability values, are maintained for a next replacement.

Figure 4:
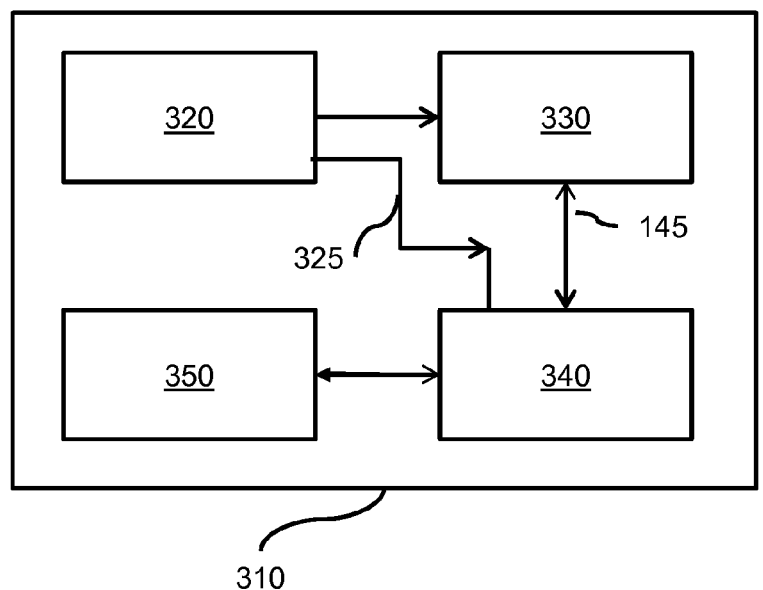
FIG. 4 shows an example of a hopset processor.

FIG. 4 shows an example of a hopset processor. The hopset processor 310 has a quality unit 320 for assessing quality for radio communication of a radio channel in the range. The hopset processor 310 has a channel controller 330 for removing a channel from the hopset when the assessed quality is below a predetermined threshold, which controller is thereto coupled to the quality unit. The channel controller is also arranged for adding a pseudorandom selected channel to the hopset, as selected by a probability unit 340 as indicated by arrow 145.

The hopset processor 310 has the probability unit 340 for providing a probability set, the probability set having probability values for respective radio channels in the range, and for adapting the probability values based on the assessed quality in the respective radio channels, which is thereto coupled to the quality unit as indicated by an arrow 325. The probability unit is arranged for pseudorandom selecting a channel from the channel pool weighted by the probability values.

The pseudorandom selection may be performed by the probability unit as follows. A probability table stores the probability values. A pseudorandom selection process is responsible for choosing a channel from the channel pool and is executed for every gap in the hopset. To explain the pseudorandom selection an analogy is used. Say the channels are persons competing in a draw. Each person buys a certain number of tickets (e.g. up to 255). When the draw takes place the person with the most tickets has the highest chance to win. Like the draw, the algorithm takes all values from the probability table corresponding to channels from the channel pool and adds them together in a variable called S (similar to putting all the tickets together). Then it chooses a pseudorandom number called P from 1 to S (similar to the draw itself). The last step deals with finding the person whose ticket was drawn. For example, the tickets may be aligned in a row on a table. The first tickets belong to the first person (or first channel in the channel pool), the next ones belong to the second person and so on. In this arrangement there is no distinction between one person's tickets, only their sum matters. Now the number P represents an index in the ticket row. The selection then proceeds to identify the person whose ticket is present at the index P. This is done by subtracting the number of tickets of each person from P until P is less than or equal to 0. The last person whose sum was subtracted is the winner. In this model the number of tickets (or values in the probability table) directly mirrors the chance of winning for each person.

Using the pseudorandom selection performs well with various interferences because it is different from strictly choosing the best channels. For example, the pseudorandom selection copes with interferers that use the same method for frequency hopping (self interference). The pseudorandom channel selection algorithm can be implemented in various practical ways to achieve the result, and a few embodiments are described now.

A hopset determination method may involve the following steps. It is assumed that an initial hopset has already been chosen. For example, this may a predetermined set, such as the first n channels in range of radio channels, or the set used in a previous radio session, or a pseudorandomly selected set. In a first step ASSESS the quality for radio communication of a radio channel in the range is assessed. For example, the assessment may be based on failure or success of the radio communication on a particular channel. In a next step DROP, a channel is removed from the hopset when the assessed quality is below a predetermined threshold, for example when communication has failed or when an amount of errors exceeds the threshold. The threshold for a quality parameter may be predetermined at a level suitable to enable acceptable communication, and if said parameter is below the threshold radio communication is severely hampered or not possible any more.

In a next step PROBA a probability table is provided. The probability table has probability values for respective radio channels in the range. The probability values are adapted based on the assessed quality in the respective radio channels. In a next step PSRAND, a channel is pseudorandom selected from the channel pool weighted by the probability values, i.e. the channels having a high probability have a high chance of being chosen, whereas the selection as such is based on a pseudo random selection process. The word pseudorandom is used, as is common in electronic generation of numbers, to indicate that a number is generated which has no direct relation to previously generated numbers. Finally, in a step ADD, the pseudorandom selected channel is added to the hopset. The selection and addition of a channel may be triggered by the removal of a bad channel, but preferably it is triggered when the hopset is exhausted. Also, a number of additions may be performed consecutively when the hopset has been reduced to a low number. After completing the replacement(s), the hopset is ready for normal use by a radio unit in the frequency hopping system.

Figure 5:
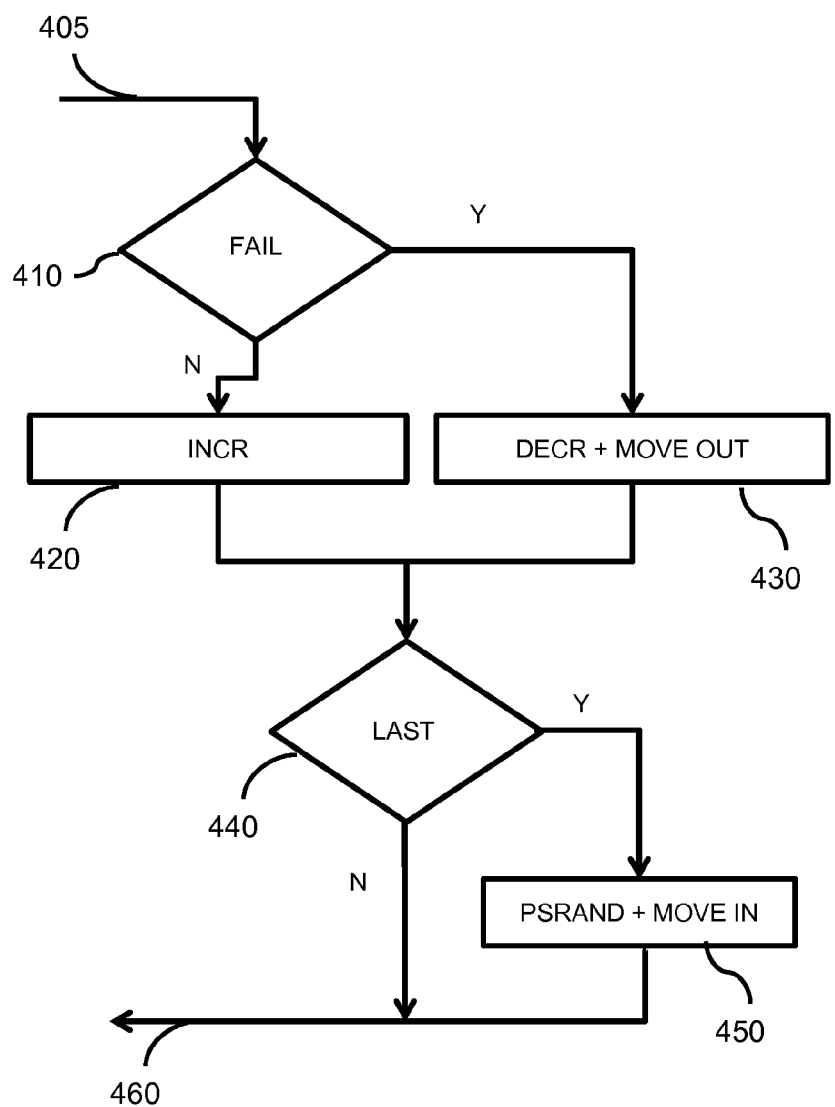
FIG. 5 shows an example of hopset control for replacing a channel in a hopset.

FIG. 5 shows an example of hopset control for replacing a channel in a hopset. When the system controller has performed radio communication, e.g. in a transmission time slot or a data package transfer, the hopset control as shown may be entered at entry point 405. In a first step FAIL 410 it is determined whether the radio communication on the used channel has failed. If the communication succeeded, the hopset control proceeds to step INCR 420, where the respective probability value of the used channel is increased, for example by a adding 1 as expressed by: probabilityTable[channel]++. However, if the radio communication on the used channel has failed, the control proceeds to step DECR+ MOVE_OUT 430, where the respective probability value of the used channel is decreased, for example by a subtracting 1 as expressed by: probabilityTable[channel]−−. Also, the channel that has failed is moved from the hopset to the channel pool, leaving an empty space in the hopset.

Subsequently, the hopset control proceeds to step LAST 440, where it is determined whether the hopset still has unused channels. A threshold for the remaining number of hopset channels may be just 1, or any number above one depending on the requirements of the frequency hopping system, such as a speed of replacement. If there is at least one unused channel, the hopset control proceeds to the system control at exit point 460. If empty spaces in the hopset must be filled, at least one channel is selected in step PSRAND+ MOV_IN 450. The selection is performed for every empty space in the hopset, and pseudorandomly chooses a channel from the channel pool taking probabilities into account. Finally the chosen channel is moved from the channel pool to the hopset.

Optionally, the hopset processor is arranged for determining whether radio communication on a respective channel has been successful, and, if so, increasing the probability value of the respective channel by a bonus amount. The bonus amount may be a fixed fraction of a maximum probability value, such as 1 for a maximum of 255. The hopset processor may be arranged for, during said increasing, limiting said probability value to a predetermined maximum, e.g. 255.

Optionally, the hopset processor is arranged for determining whether radio communication on a respective channel has failed, and, if so, decreasing the probability value of the respective channel by a malus amount. The malus amount is a negative value that decreases the probability value. The hopset processor may be arranged for, during said decreasing, limiting said probability value to a predetermined minimum, for example 0 or 1. The bonus amount may be equal to, or smaller than, the malus amount. Optionally, the bonus amount and/or the malus amount are set to respective, different values in dependence of an amount of radio communication present on the channels. Using different increments/ decrements enable optimizations. One example can be in system reaction time. For example, a bad channel is dramatically penalized and a good channel mildly rewarded in a friendlier, less crowded medium, or vice versa in a crowded environment for better performance. Another example is in differentiating the type of interferer, such as, if a channel experiences communication failure 5 times in a row, then decrease probability to a minimum because most likely there is a static frequency interferer present. Hence, such different increments and/or decrements may be used instead of using a bonus amount of 1, and enable optimizations.

A process for pseudorandom selection of a channel from the channel pool is described now. The hopset processor is arranged for said pseudorandom selecting by generating a pseudorandom number lower than the sum of the probability values of all pool channels. Then, until a cumulative sum is larger than the pseudorandom number, repetitively, for subsequent index numbers, subsequent cumulative sums are calculated of the probability values of the first pool channel up to an index number of pool channels. If the cumulative sum is larger than the pseudorandom number, the pool channel having the index number is selected as the pseudorandom selected. Selection of a channel in a pseudorandom way conforming to the probability table can be expressed by the following coded process:

--- calculate the sum (S) of probabilities of all channels in the channel pool;
generate a pseudorandom number (P) between 1 and S;
    index = 0;
    while (P > 0) {
        P = P − probabilityTable[channelPool[index]];
        index ++;
    }
chosen channel = channelPool[index−1].

---

In the above coded process probabilityTable[channelPool [index]] means the probability value for a channel from the channel pool, all channels having subsequent numbers called index. The while loop increases the index (by index++) until P is zero or less, and selects the channel at the than reached value of the index.

Optionally, another table may be added for long term measurements, which table may be used to set increments of decrements. It is noted that the above probability table inherently also has a long term effect. For example let's take a channel that did not fail for a long time so its probability will be 255. If at this time it experiences failure its probability will be decremented to 254 and that makes a 0.4% difference. The old measurements contributed with 99.6% to the new value and the new measurement contributed with 0.4%. Of course this ratio can be modified by altering the value by which the probability is incremented/decremented. A higher value will make newer events more significant.

Figure 6:
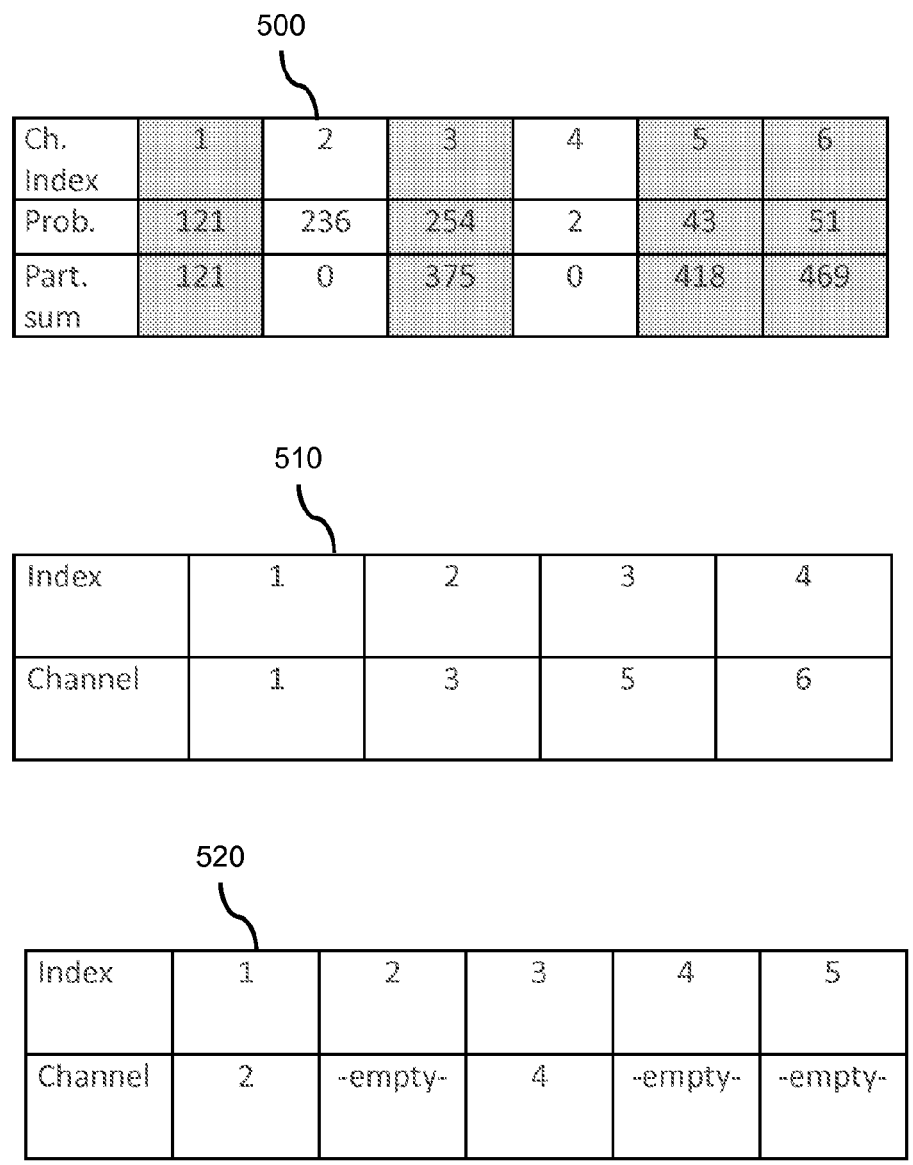
FIG. 6 shows an example of a probability table, channel pool and hopset.

FIG. 6 shows an example of a probability table, channel pool and hopset. The probability table 500 shows in a first row the channel index, in a second row the probability value, and in a third row a partial sum. The channel pool 510 is shown having the channel numbers that are part of the channel pool in a row, each position in the channel pool being indicated by an index. The hopset 520 is shown having the channel numbers of channels or empty position in a row, each position in the hopset being indicated by an index. It is noted that values are for example only. The index of the probability table is the channel number itself regardless whether it belongs in the hopset or pool.

In the probability table the channels in grey columns are channels in the channel pool, and the channels in white columns are in the hopset. Channel 4 is a channel that was rather bad when it was used in the past but, due to the pseudorandom selection, i.e. a probabilistic system, it still had a (small) chance of being used again. This time it was chosen, which situation may be useful if there is a frequency static interferer that for some reason disappeared, for example got turned off, and the channel being again free to use. Channel 3 happened to fail this time for some reason (e.g. due to collision with another frequency hopping system, or a microwave oven was turned on), so it must be changed. Note that channel 4 cannot have the minimum probability when moved to the current hopset because when it was chosen at the beginning of the current hopset it would have had a probability of 1 and because it was good its probability must have been incremented to 2. Similarly, channel 3 cannot have the highest probability at the end of the current hopset and be bad; in the example the probability has been decremented from the highest value 255 to 254 when it failed.

In practice various tables or arrays may be used. For example 3 one-dimensional tables: the hopset (a list of currently used channels), the channel pool (a list of currently unused channels) and the probability table (a list of probability values for every channel; from the hopset and from the channel pool). Optionally a second row in the probability table may hold a 1 if the channel is in the hopset or a 0 if it is in the channel pool to avoid explicitly moving a channel from one table to another. Probability values from the probability table are preserved when a channel is moved from one table to another.

The partial sums in the third row in FIG. 6 are partial cumulative sums. A respective partial cumulative sum of a channel having a specific index number is a sum of the probability values of the first pool channel up to the channel having that index number. The hopset processor is arranged for said pseudorandom selecting by calculating the partial cumulative sum for each channel in the channel pool, which are stored in the table. Than a pseudorandom number is generated lower than the sum of the probability values of all pool channels. The pool channel that has the partial cumulative sum exceeding the pseudorandom number by the smallest amount is selected as the pseudorandom selected channel.

In an embodiment, the hopset processor may perform selecting by, until a respective partial cumulative sum is larger than the pseudorandom number, repetitively, for subsequent index numbers, comparing the pseudorandom number to the respective partial cumulative sum of the first pool channel up to the pool channel having the index number. If the cumulative sum is larger than the pseudorandom number, the pool channel having the index number is selected as the pseudorandom selected channel. Alternatively, the hopset processor may execute said selecting by arranging the partial cumulative sums in an array in increasing or decreasing order, and perform, in the array, a binary search for the pseudorandom number. The pool channel having the partial cumulative sum that is found in the binary search to be nearest to the pseudorandom number is selected as the pseudorandom selected channel Selection of a channel in a pseudorandom way conforming to the probability table using partial sums may be expressed by the following coded process:

```
S=0;
for (index = 1; index <= chNum; index++) /*calculates the partial sums of all probabilities of the channels in the channel pool*/
{
    S = S + probabilityTable[channelPool[index]][0]; /* only if channel is in channelPool */
    probabilityTable[channelPool[index]] [1] = S;
}
P = pRand(S); /*Generates a pseudorandom number between 1 and S*/
for (index = 1; index <= chNum; index++)
{
    if( probabilityTable[channelPool[index]][1] >= P )
    {
        chosenCh = channelPool[index];
        break;
    }
}
```

The algorithm chooses one channel from the channel pool, so it must be executed for every empty space in the hopset. It is noted that cumulative partial sum may not be calculated for channels that are already in the hopset. Only channels from the channel pool are selectable so it is pointless to calculate partial sums for hopset channels. The chNum is the number of channels in the channel pool (in the example of FIG. 6, chNum=4). ProbabilityTable[channelPool[2]][0] refers to the probability of the second channel in the channel pool (which is channel 3), and probabilityTable[2][0] stores the probability of channel #2 and probabilityTable[2][1] stores the partial sum of channel #2. The channel pool and hopset tables of FIG. 6 correspond to the final status of the current hopset at the end of its use.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices, such as a FPGA (Field Programmable Gate Array) or units able to perform the desired device functions by operating in accordance with suitable program code, e.g. so-called firmware. The FPGA is an integrated circuit designed to be configured by a customer or a designer after manufacturing, so-called "field-programmable". The FPGA configuration is generally specified using a hardware description language (HDL). Furthermore, the device may be physically distributed over a number of apparatuses, while functionally operating as a single device.

Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method comprising:
assessing quality of a radio channel for a frequency hopping radio communication system, wherein
the radio channel is in a range of channels available for radio communication,
the range of channels available for radio communication comprises a hopset of channels used for frequency hopping that is a subset of channels in the range of channels and a channel pool of channels not comprised in the hopset, and
the frequency hopping radio communication system comprises a hopset processor that performs said assessing;
removing the channel from the hopset when the assessed quality is below a predetermined threshold;
providing a probability set, wherein the probability set comprises selection probability values for respective radio channels in the range of channels;
modifying the probability values based on the assessed quality in the respective radio channels;
pseudorandomly selecting a channel from the channel pool weighted by the probability values;
adding the pseudorandomly selected channel to the hopset; and
controlling a radio transceiver to perform a first radio communication on a first radio channel from the hopset, wherein the radio transceiver is coupled to the hopset processor.

2. The method of claim 1 further comprising, after removing a respective channel from the hopset, adding the respective channel to the channel pool.

3. The method of claim 1 further comprising, after removing a respective channel from the hopset, decreasing the probability value of the respective channel by a predetermined amount.

4. The method of claim 1, wherein said pseudorandom selecting comprises:
generating a pseudorandom number lower than the sum of the probability values of all pool channels; and
until a cumulative sum is larger than the pseudorandom number,
repetitively, for subsequent index numbers, calculating subsequent cumulative sums of the probability values of the first pool channel up to an index number of pool channels,
and, if the cumulative sum is larger than the pseudorandom number, selecting the pool channel having the index number as the pseudorandom selected channel.

5. The method of claim 1, wherein said pseudorandom selecting comprises:
calculating a partial cumulative sum for each channel in the channel pool, the respective partial cumulative sum of the channel having an index number being a sum of the probability values of the first pool channel up to the channel having the index number;
generating a pseudorandom number lower than the sum of the probability values of all pool channels; and
selecting the pool channel that has the partial cumulative sum exceeding the pseudorandom number by the smallest amount as the pseudorandom selected channel.

6. The method of claim 5, wherein said selecting the pool channel further comprises, until a respective partial cumulative sum is larger than the pseudorandom number:
repetitively, for subsequent index numbers, comparing the pseudorandom number to the respective partial cumulative sum of the first pool channel up to the pool channel having the index number;
and if the cumulative sum is larger than the pseudorandom number, selecting the pool channel having the index number as the pseudorandom selected channel.

7. The method of claim 5, wherein said selecting the pool channel further comprises:
arranging the partial cumulative sums in an array in increasing or decreasing order;
performing, in the array, a binary search for the pseudorandom number; and
selecting the pool channel having the partial cumulative sum that is found in the binary search to be nearest to the pseudorandom number as the pseudorandom selected channel.

8. The method of claim 1, further comprising:
determining whether radio communication on a respective channel has been successful; and
if so, increasing the probability value of the respective channel by a bonus amount.

9. The method of claim 8 further comprising
during said increasing, limiting said probability value to a predetermined maximum.

10. The method of claim 8 further comprising:
determining whether radio communication on a respective channel has failed;

and if so, decreasing the probability value of the respective channel by a malus amount.

11. The method of claim 10 further comprising
during said decreasing, limiting said probability value to a predetermined minimum.

12. The method of claim 10, wherein
the bonus amount is smaller than the malus amount.

13. The method of claim 10, wherein
one or more of the bonus amount and the malus amount are set to respective, different values in dependence of an amount of radio communication present on the channels.

14. The method of claim 1 further comprising:
determining whether errors occurring during radio communication on a respective channel exceed a predetermined level;
and if so, decreasing the probability value of the respective channel by an error quantity.

15. The method of claim 14 further comprising:
during said decreasing, determining said error quantity in dependence of the amount of the errors occurring.

16. The method of claim 1 further comprising:
determining whether a signal to noise ratio on a respective channel exceeds a predetermined level;
and if so, decreasing the probability value of the respective channel by a noise quantity.

17. The method of claim 16 further comprising
during said decreasing, determining said noise quantity in dependence of signal to noise ratio.

18. An apparatus to determine a hopset for a frequency hopping radio communication system, the apparatus comprising:
a receiver unit, configured to receive a signal on a radio channel, wherein
the receiver unit comprises a channel quality unit configured to assess a quality of radio transmission for a radio channel, and
the radio channel is in a range of channels available for radio communication;
a hopset processor, coupled to the receiver unit, and configured to
remove the radio channel from a hopset of channels if the assessed quality of radio transmission for the radio channel is less than a predetermined threshold, wherein the range of channels comprises the hopset of channels that comprises a subset of channels in the range of channels and a channel pool of channels in the range of channels that is not comprised in the hopset,
provide a probability set that comprises selection probability values for respective radio channels in the range of channels,
modify a selection probability value for the radio channel based on the assessed quality of radio transmission for the radio channel, and
pseudorandomly select a channel to add to the hopset from the channel pool using the probability set; and
a radio unit coupled to the hopset processor, and configured to perform a first radio communication on a first radio channel from the hopset.

19. The apparatus of claim 18 further comprising one or more of:
a signal-to-noise ratio measurement unit, coupled to the receiver unit, and configured to provide a signal-to-noise ratio for said assessment of quality of radio transmission for the radio channel; and
a received signal strength measurement unit, coupled to the receiver unit, and configured to provide a received signal strength value for said assessment of quality of radio transmission for the radio channel.

20. The apparatus of claim 18, wherein the radio unit comprises the receiver unit.

* * * * *